US012603188B2

(12) United States Patent
Xu et al.

(10) Patent No.: US 12,603,188 B2
(45) Date of Patent: Apr. 14, 2026

(54) METHOD FOR DEHALOGENATION AND VITRIFICATION OF RADIOACTIVE METAL HALIDE WASTES

(71) Applicant: WUHAN UNIVERSITY OF TECHNOLOGY, Hubei (CN)

(72) Inventors: Kai Xu, Hubei (CN); Yaogang Dong, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 1104 days.

(21) Appl. No.: 17/585,459

(22) Filed: Jan. 26, 2022

(65) Prior Publication Data

US 2023/0139928 A1 May 4, 2023

(30) Foreign Application Priority Data

Nov. 2, 2021 (CN) ........................ 202111289631.6

(51) Int. Cl.
*G21F 9/30* (2006.01)

(52) U.S. Cl.
CPC .................................... *G21F 9/305* (2013.01)

(58) Field of Classification Search
CPC ........................................................ G21F 9/305
See application file for complete search history.

(56) References Cited

U.S. PATENT DOCUMENTS

2012/0165594 A1* 6/2012 Park .......................... G21F 9/30 588/18

FOREIGN PATENT DOCUMENTS

CN 108642503 * 10/2018 ........... C01B 17/901

OTHER PUBLICATIONS

Farid, et al. "An assessment of initial leaching characteristics of alkali-borosilicate glasses for nuclear waste immobilization." Materials 12.9 (2019): 1462. (Year: 2019).*

Kenneth J. Bateman et al., "Scale Up of Ceramic Waste Forms for Electrorefiner Salts Produced during Spent Fuel Treatment", JNFCWT, vol. 13, Issue 5, Nov. 2015, pp. 55-75.

(Continued)

*Primary Examiner* — Anthony J Zimmer
*Assistant Examiner* — Eric Scott Sherman
(74) *Attorney, Agent, or Firm* — JCIPRNET

(57) ABSTRACT

The present disclosure relates to a method for dehalogenation and vitrification of radioactive metal halide wastes. The dehalogenation method of radioactive metal halide wastes includes the following steps: mixing the radioactive metal halide wastes with oxalic acid, and performing a thermal treatment to remove halogens from the radioactive metal halide wastes. The vitrification method includes a following step: immobilizing the dehalogenated wastes treated by the dehalogenation method of radioactive metal halide wastes into a vitrified form by adding glass additives. The benefits of the method for dehalogenation and vitrification of radioactive metal halide wastes provided by the present disclosure include not only low dehalogenation temperature, high dehalogenation efficiency and high waste loading in the vitrified form, but also no new substances introduced after dehalogenation, which is easy to be integrated with the existing vitrification process. Therefore, the present disclosure shows a promising application.

16 Claims, 4 Drawing Sheets

(56) References Cited

OTHER PUBLICATIONS

Hwan-Seo Park et al., "Stabilization/Solidification of Radioactive Salt Waste by Using xSiO2-yAl2O3-zP2O5 (SAP) Material at Molten Salt State", Environmental Science & Technology, vol. 42, Oct. 2008, pp. 9357-9362.

Brian J. Riley et al., "Dehalogenation of electrochemical processing salt simulants with ammonium phosphates and immobilization of salt cations in an iron phosphate glass waste form", Journal of Nuclear Materials, vol. 529, Dec. 2009, pp. 1-16.

* cited by examiner

METHOD FOR DEHALOGENATION AND VITRIFICATION OF RADIOACTIVE METAL HALIDE WASTES

CROSS-REFERENCE TO RELATED APPLICATION

The present application is based on and claims the priority benefits of China application No. 202111289631.6, filed on Nov. 2, 2021. The entirety of the above-mentioned patent application is hereby incorporated by reference herein and made a part of this specification.

BACKGROUND

Technical Field

The present disclosure relates to the art field of treatment of radioactive wastes, and in particular, to a method for dehalogenation and vitrification of radioactive metal halide wastes.

Description of Related Art

Nuclear energy is a safe, economical and efficient clean energy, and it is also one of the main energy sources to achieve the goal of peak carbon dioxide emissions and carbon neutrality in China. The reprocessing of spent nuclear fuel, through which the usable uranium and plutonium could be recovered, is quite significant to sustainably develop the nuclear energy. The dry reprocessing of spent fuel has become one of the most promising technologies for advanced fuel cycle, because of its advantages on radiation resistance, low critical risk, wide scope of treatable materials and less produced radioactive wastes.

In dry reprocessing of spent fuel, halides are generally used as diluents, during which metal halide salt radioactive wastes are produced. For example, molten salt electrorefining process uses metal spent fuel as anode and chloride molten salts as electrolyte to separate actinides and fission elements according to the difference on redox potentials, and finally uranium and plutonium are deposited on inert cathode. As fission elements accumulate in molten salts, the separation efficiency of actinides and fission elements decreases and the purity of recovered products from cathode reduce as well. Therefore, the molten salts would be renewed and the molten halide salt wastes are generated, which should be treated and disposed, according to nuclear waste management. In addition, molten salt reactors (MSRs) utilize mixed fluoride molten salts as fuel carriers and coolants, and fluorides are usually used as oxidants and adsorbents in dry reprocessing of spent fuel generated from MSRs. Uranium, thorium, molten salt fuel carriers and fission products are separated by fluoride volatilization, vacuum distillation, molten salt extraction and other dry reprocessing processes. Therefore, a variety of fluoride wastes are inevitably generated.

Because of direct contact with irradiated fuel, these radioactive metal halide wastes, which usually contain a large amount of halogens (generally more than 40 wt %), are classified as high-level wastes (HLW). For the treatment of HLW, vitrifying HLW in borosilicate glass is currently a mature technology in the word. However, the low solubility of halogens in borosilicate glass (generally less than 1 wt %) limits the waste loading of vitrified form. In addition, in the process of high-temperature melting, the volatilization of halide easily leads to the migration of nuclides. Therefore, the current vitrification process is not suitable for treating radioactive metal halide wastes.

At present, two approaches to treat radioactive metal halide wastes have been proposed, accordingly to the high content of halogens in the wastes. One is to use material with a high solubility of halogens as a host matrix. For example, Argonne National Laboratory in the United States has developed the glass-bonded sodalite ceramic waste form and the processing capacity could reach 300 to 400 kg per batch (Bateman K. J, Morrisona M. C, Rappleye D. S, Simpson M. F, Frank S. M, Scale up of ceramic waste forms for electrorefiner salts produced during spent fuel treatment [J], Journal of Nuclear Fuel Cycle and Waste Technology, 2015, 13: 55), however, this process is quite complicated and the waste loading is rather low (8 to 14 wt %). The other approach is to remove halogens from the wastes in the first step, and immobilize the remaining wastes in the second step. For example, Korea Atomic Energy Research Institute has developed SAP ($SiO_2$—$Al_2O_3$—$P_2O_5$) compounds, which could be synthesized by a sol-gel method as dechlorination reactants, and the high efficiency of dechlorination from chloride molten salt wastes could be achieved at 650° C. (Park H. S, Kim I. T, Cho Y. Z, Eun H. C, Lee H. S, Stabilization/solidification of radioactive salt waste by using $xSiO_2$-$yAl_2O_3$-$zP_2O_5$ (SAP) material at molten salt state [J], Environmental Science & Technology, 2008, 42: 9357), but, the dechlorinated SAP compounds is poorly compatible with the waste form. Recently, Pacific Northwest National Laboratory found $NH_4H_2PO_4$ could effectively remove chlorine from chloride wastes at 600° C., but the remaining wastes after dechlorination contain a large amount of phosphates, which usually should be vitrified in phosphate glass matrix (Riley B. J, Peterson J. A, Vienna J. D, Ebert W. L, Frank S. M, Dehalogenation of electrochemical processing salt simulants with ammonium phosphates and immobilization of salt cations in an iron phosphate glass waste form [J], Journal of Nuclear Materials, 2020, 529: 151949). However, phosphate glass is particularly corrosive to refractories and metal electrodes of furnaces, which makes it hard to apply in industry.

The proposed approaches have their own pros and cons, for example, the glass-bonded sodalite ceramic waste form could incorporate a high halogens, but the process is quite complicated; The dehalogenation and immobilization two-step process could remove halogens from the wastes, but the remaining new substances after dehalogenation bring challenges for the subsequent development of waste forms; in addition, the current dehalogenation temperature is high (greater than 600° C.), which could lead to the migration risk of volatile nuclides from the wastes during dehalogenation process. Therefore, it is necessary to develop a reliable and simple process to safely treat radioactive metal halide wastes.

SUMMARY

Accordingly, the present disclosure provides a dehalogenation and vitrification method to treat radioactive metal halide wastes, which would resolve the problems of current approaches, including complicated process, high dehalogenation temperature and poor compatibility between remaining dehalogenated substances and waste form in the prior art of treating metal halide wastes.

The first aspect of the present disclosure provides a dehalogenation method of radioactive metal halide wastes, which includes the following steps:

Mixing the radioactive metal halide wastes with oxalic acid; and performing a thermal treatment to remove halogens from the radioactive metal halide wastes.

The second aspect of the present disclosure provides a vitrification method, which includes a following step.

Immobilizing the remaining dehalogenated wastes treated by the first aspect of the present disclosure into a vitrified form by adding glass additives.

The third aspect of the present disclosure provides a vitrified form, which was prepared by the vitrification method provided in the second aspect of the present disclosure.

Compared with current approaches, this disclosure has the following beneficial effects.

(1) The dehalogenation method of the present disclosure has low dehalogenation temperature and high dehalogenation efficiency, which not only aids to save energy and to easily operate, but also decreases the migration risk of volatile nuclides.

(2) No new substances remain after dehalogenation. Dehalogenated wastes could be vitrified to form a glass matrix with a high waste loading, and the chemical durability of thus prepared vitrified form meets the disposal requirements of HLW vitrified form.

(3) The present disclosure proposes the method of dehalogenation with oxalic acid in the first step, and vitrifying the remaining wastes in the second step, which makes it possible to treat radioactive metal halide wastes with the existing mature vitrification process. Additionally, the technical route of this method is uncomplicated and practical, and has a good application prospect.

DETAILED DESCRIPTION

In order to make the purpose, technical scheme and advantages of the present disclosure clearer, this disclosure is further described in detail below with reference to the drawings and embodiments. It should be understood that the specific embodiments described here are only used to explain the present disclosure, but not to limit itself.

Figure 1:
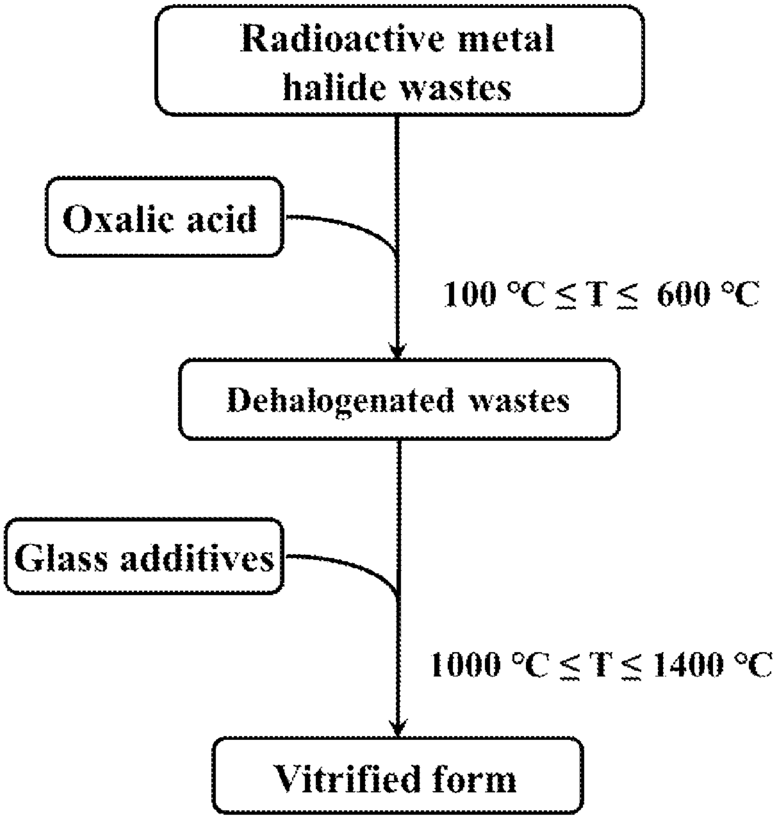
FIG. 1 is a flow diagram of the dehalogenation and vitrification route for radioactive metal halide wastes of the present disclosure.

Referring to FIG. 1, the first aspect of the present disclosure provides a dehalogenation method of radioactive metal halide wastes, which includes the following steps: mixing the radioactive metal halide wastes with oxalic acid, and performing a thermal treatment to remove halogens from the radioactive metal halide wastes.

In the present disclosure, the temperature of the thermal treatment spans from 100° C. to 600° C. Further, the temperature of the thermal treatment spans from 250° C. to 500° C., wherein the dehalogenation efficiency could reach more than 90%. Further, the temperature of the thermal treatment spans from 280° C. to 400° C. wherein the extremely high dehalogenation efficiency could be achieved at such a low temperature, and the migration risk of volatile nuclides could be reduced as well.

Furthermore, a duration of the thermal treatment spans from 20 min to 1000 min. Further, the duration of the thermal treatment spans from 60 min to 600 min. Further, the duration of the thermal treatment spans from 90 min to 300 min.

In some embodiments of the present disclosure, a resulting mixture of radioactive metal halide wastes with oxalic acid is maintained in an environment preheated to the target temperature to perform a thermal treatment. In this process, the duration of the thermal treatment spans preferably from 30 min to 500 min, more preferably from 60 min to 300 min.

In some embodiments of the present disclosure, a resulting mixture of radioactive metal halide wastes with oxalic acid is heated to the target temperature in the furnace at a heating rate of 1° C./min to 20° C./min. In this process, the duration of the thermal treatment includes heating time and dwelling time. Further, a resulting mixture of radioactive metal halide wastes with oxalic acid is heated to the target temperature in the furnace at a heating rate of 1° C./min to 10° C./min, and maintaining at the target temperature for 0 min to 180 min.

Preferably, the heating rate spans from 4° C./min to 8° C./min.

In some more embodiments of the present disclosure, the thermal treatment process is as follows: a resulting mixture of radioactive metal halide wastes with oxalic acid is heated to 300° C. in the furnace at a heating rate of 5° C./min, and maintaining at 300° C. for 0 min to 120 min.

Preferably, when the resulting mixture of radioactive metal halide wastes and oxalic acid is heated to the target temperature at a heating rate of 1° C./min to 10° C./min for thermal treatment, the dwelling time spans preferably from 30 min to 90 min.

In the present disclosure, both the radioactive metal halide wastes and oxalic acid are solid powders, which are helpful to mix the mixture evenly and increasing the dehalogenation efficiency. Further, an average grain size of radioactive metal halide wastes and oxalic acid is less than 100 mesh.

In some embodiments of the present disclosure, the radioactive metal halide wastes and oxalic acid solid are mixed and crushed before performing a thermal treatment, and an average grain size of the mixture is less than 100 mesh.

In the dehalogenation process of the present disclosure, the molar ratio of oxalic acid to halogens is more than 0.5. Further, the molar ratio of oxalic acid to halogens is more than 0.8. Further, the molar ratio of oxalic acid to halogens is more than 1. Further, the molar ratio of oxalic acid to halogens spans from 1.2 to 3, wherein the dehalogenation efficiency could reach over 90%. Further, the molar ratio of oxalic acid to halogens spans from 1.5 to 2.5, wherein the dehalogenation efficiency could also reach over 90% and the amount of oxalic acid is reduced.

In some preferred embodiments of the present disclosure, the molar ratio of oxalic acid to halogens is 2.

In the present disclosure, the radioactive metal halide wastes include at least one of chloride molten salt wastes and fluoride molten salt wastes generated from dry reprocessing of spent nuclear fuel. Further, the chloride molten salt wastes include at least one of alkali metal chlorides, alkaline earth metal chlorides and rare earth metal chlorides; and fluoride molten salt wastes include at least one of alkali metal fluorides, alkaline earth metal fluorides and rare earth metal fluorides. Further, chloride molten salt wastes include LiCl, KCl, NaCl, CsCl, $SrCl_2$ and rare earth metal chlorides; fluoride molten salt wastes include LiF, NaF, KF, CsF, $MgF_2$, $SrF_2$, and rare earth metal fluorides.

The second aspect of the present disclosure provides a vitrification method, which includes a following step: immobilizing the remaining dehalogenated wastes treated by the first aspect of the present disclosure into a vitrified form by adding glass additives.

In the present disclosure, the glass additives for forming a vitrified form are borosilicate glass forming chemicals. Further, the glass additives for forming a vitrified form include the following components: 63 wt % to 70 wt % of $SiO_2$, 17 wt % to 22 wt % of $B_2O_3$, 6 wt % to 8 wt % of $Al_2O_3$ and 5 wt % to 10 wt % of CaO.

In the present disclosure, in terms of the weight percentage of oxides, the waste loading of vitrified form for radioactive wastes spans from 15% to 35%. Further, the waste loading of vitrified form for radioactive wastes spans from 20% to 35%. Further, the waste loading of vitrified form for radioactive wastes spans from 25% to 35%.

In the present disclosure, immobilizing the remaining radioactive wastes treated by the first aspect of the present disclosure into a vitrified form by adding glass additives includes the following steps: mixing the dehalogenated wastes with glass additives, and preparing a vitrified form by heating, melting and cooling.

In the present disclosure, a temperature of the heating and melting spans from 1000° C. to 1400° C. Further, the temperature of the heating and melting spans from 1100° C. to 1200° C. A duration of the heating and melting spans from 1 hour to 6 hours. Further, the duration of the heating and melting spans from 1 hour to 3 hours.

In some embodiments of the present disclosure, the temperature of the heating and melting is 1200° C. and the duration of the heating and melting spans from 1 hour to 2 hours.

The third aspect of the present disclosure provides a vitrified form, which was prepared by the vitrification method provided in the second aspect of this disclosure.

Embodiment 1

In this embodiment, non-radioactive chlorides were used to simulate electrorefining salt wastes generated from electrochemical processing of spent nuclear fuel, as shown in Table 1. A total weight of 20 g of oxalic acid and chloride molten salt wastes were weighed and fully mixed in different proportion; the resulting mixtures were placed in 100 mL corundum crucibles; the samples were heated to 100° C. to 600° C. in the furnace at a heating rate of 5° C./min and maintained at target temperatures for 0 min to 120 min; afterwards, the crucibles were taken out and cooled in air to room temperature to obtain dechlorinated wastes. The chlorine removal efficiency (CRE) was calculated using the following formula, $$CRE = \frac{M_1 - M_2}{M_1} \times 100\%$$

where $M_1$ and $M_2$ were the mass of chlorine in the original waste and dechlorinated waste, respectively.

TABLE 1

Composition of the chloride molten salt waste (wt %)

| Component | wt % |
|---|---|
| LiCl | 32.32 |
| KCl | 38.68 |
| NaCl | 9.00 |
| CsI | 7.00 |
| $SrCl_2$ | 3.00 |
| $CeCl_3$ | 5.00 |
| $NdCl_3$ | 5.00 |
| SUM | 100.00 |

Figure 2:
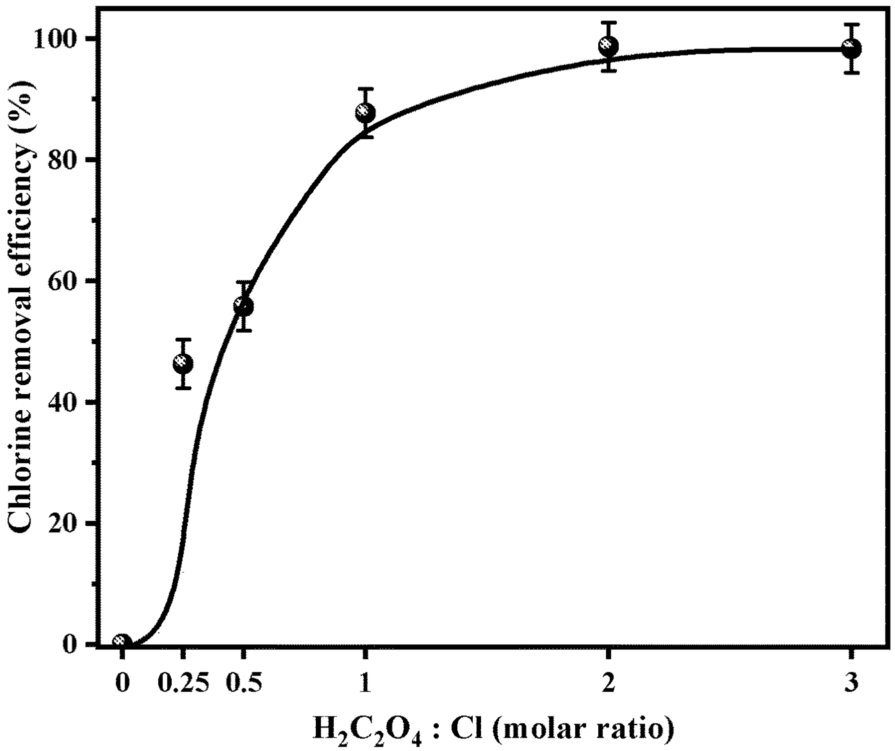
FIG. 2 is the effect of molar ratio of oxalic acid to chlorine on chlorine removal efficiency in embodiment 1 of the present disclosure.
Figure 3:
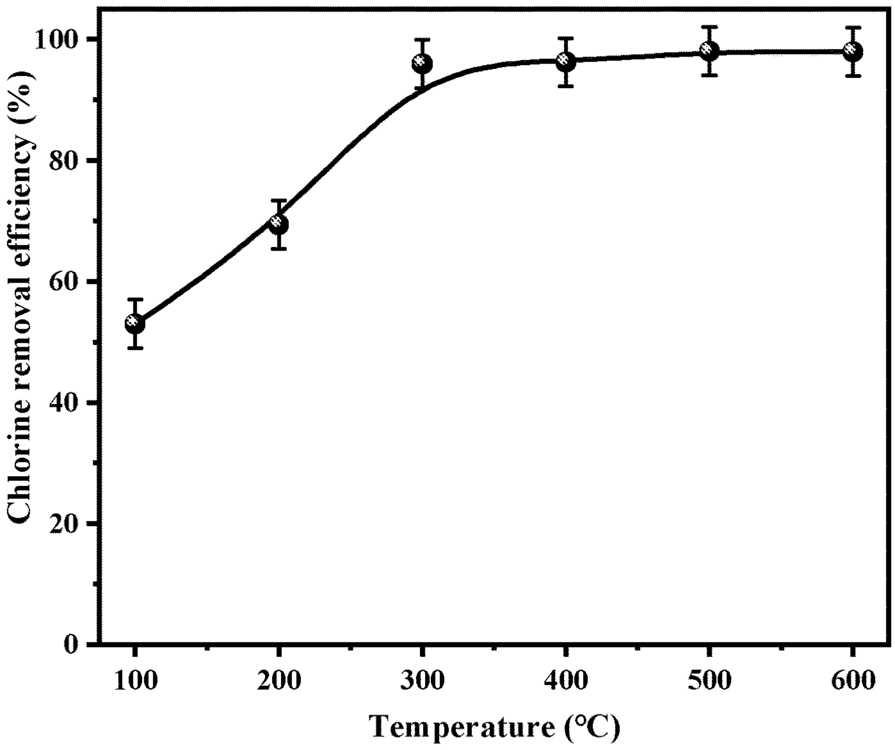
FIG. 3 is the effect of temperature of the thermal treatment on chlorine removal efficiency in embodiment 1 of the present disclosure.
Figure 4:
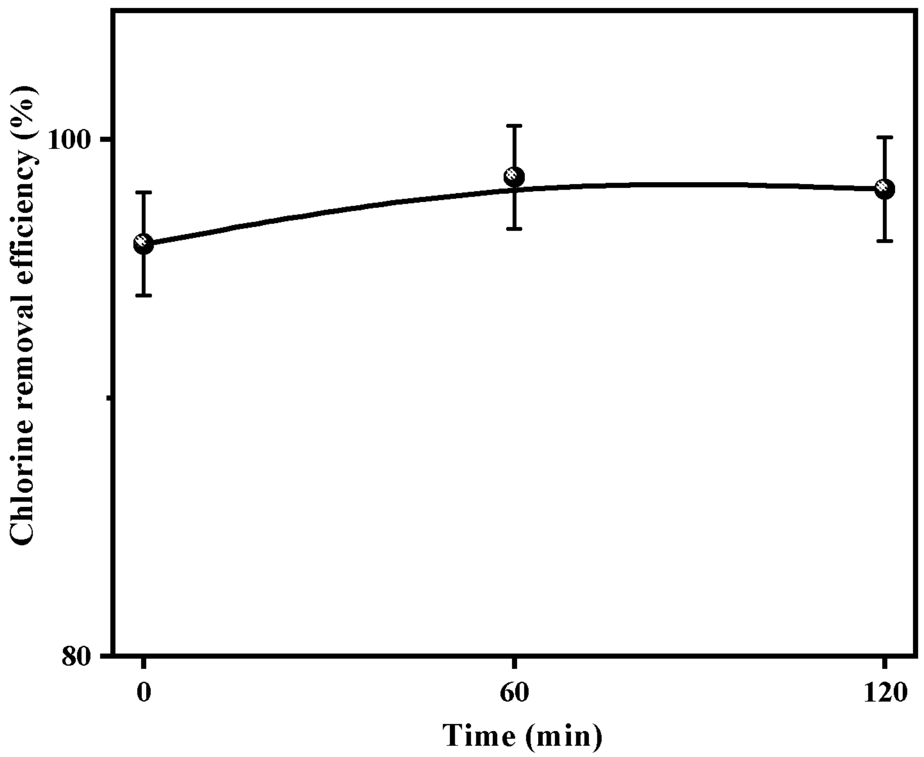
FIG. 4 is the effect of dwelling time on chlorine removal efficiency in embodiment 1 of the present disclosure.

The effects of molar ratio of oxalic acid to chlorine, a temperature of thermal treatment and dwelling time on chlorine removal efficiency were shown in FIGS. 2 to 4, respectively. The temperature of the thermal treatment in FIG. 2 was 300° C., and the dwelling time was 60 min; the molar ratio of oxalic acid to chlorine in FIG. 3 was 2, and the dwelling time was 0 min; the molar ratio of oxalic acid to chlorine in FIG. 4 was 2, and the temperature of the thermal treatment was 300° C. According to FIGS. 2 to 4, the optimal parameters for dechlorination was as follows: the molar ratio of oxalic acid to chlorine was 2, the temperature of the thermal treatment was 300° C., and the dwelling time at 300° C. was 60 min, resulting in the high dechlorination efficiency up to 99%. Thus obtained dechlorinated waste was then immobilized into a vitrified form: a total weight of 20 g of dechlorinated waste and glass additives was weighed and fully mixed according to the glass formula designed in Table 2 (the waste loading was 35 wt %); the resulting mixture was placed in a 50 mL corundum crucible; the sample was maintained in a muffle furnace at 1200° C. for 1 hour; glass melt was poured on a preheated copper plate mold and cooled to obtain a vitrified form.

TABLE 2

The percentage of the dechlorinated waste and glass additives in the designed glass formula of embodiment 1 (wt %)

| Component | Dechlorinated waste | Glass additive |
|---|---|---|
| $SiO_2$ | | 45.01 |
| $B_2O_3$ | | 12.34 |
| $Al_2O_3$ | | 4.32 |
| CaO | | 3.33 |
| $K_2O$ | 15.83 | |
| $Li_2O$ | 7.54 | |
| $Na_2O$ | 2.90 | |
| $Cs_2O$ | 2.36 | |
| $CeO_2$ | 2.10 | |
| $Nd_2O_3$ | 2.03 | |
| SrO | 1.10 | |
| I | 0.88 | |
| Cl | 0.26 | |
| SUM | 35.00 | 65.00 |

Figure 5:
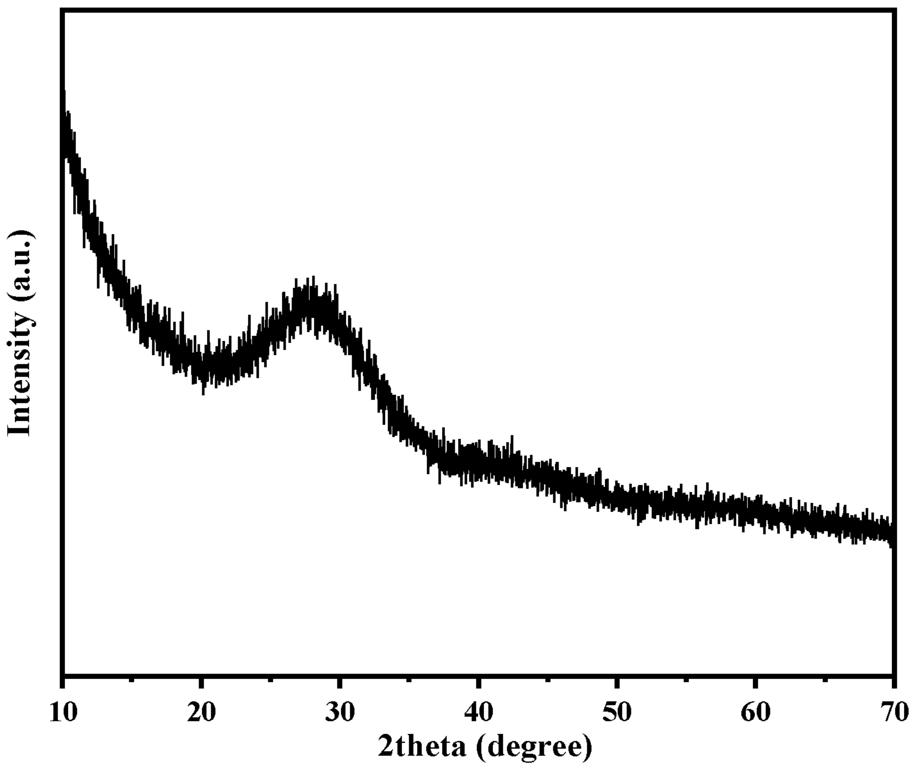
FIG. 5 is an XRD pattern of the vitrified form prepared in embodiment 1 of the present disclosure.

The XRD diffraction pattern (FIG. 5) of the vitrified form prepared in embodiment 1 presents a typical amorphous hump, which proves that the prepared waste form is a glass. An Archimedes principle was used to measure a density, which was 2.58 g/cm$^3$. The chemical durability of vitrified form was evaluated according to the 7-day Product Consistency Test (PCT-7) and the normalized releases of major elements from PCT-7 of the vitrified form in embodiment 1 are shown in Table 3. The values of each element normalized release were lower than 2 $g/m^2$, which meets the requirements of chemical durability of HLW vitrified form.

TABLE 3

Normalized releases of major elements from PCT-7 of the vitrified form in embodiment 1

| Elements | Normalized releases of elements ($r_i$) ($g/m^2$) |
|---|---|
| B | 0.7328 |
| Na | 1.2499 |
| K | 0.6588 |
| Li | 1.4559 |
| Ca | 0.0030 |
| Al | 0.3977 |
| Si | 0.3422 |
| Sr | 0.0167 |
| Cs | 0.3980 |
| Ce | 0.0021 |
| Nd | 0.0040 |

Embodiment 2

In this embodiment, non-radioactive fluorides were used to simulate fluoride molten salt wastes generated from dry reprocessing of spent nuclear fuel of MSRs, as shown in Table 4. A total weight of 20 g of oxalic acid and fluoride molten salt wastes were weighed according to the molar ratio (2) of oxalic acid to fluorine and fully mixed; the resulting mixture was placed in a 100 mL corundum crucible; the sample was heated to 300° C. at a heating rate of 5° C./min and maintained at 300° C. for 60 min; afterwards, the sample was taken out and cooled in air to room temperature to obtain the defluorinated waste. The fluorine removal efficiency (FRE) was calculated using the following formula.

$$FRE = \frac{M_3 - M_4}{M_3} \times 100\%$$

where $M_3$ and $M_4$ were the mass of fluorine in the original waste and defluorinated waste, respectively

TABLE 4

Composition of the fluoride molten salt waste (wt %)

| Component | wt % |
|---|---|
| KF | 68.31 |
| NaF | 20.61 |
| LiF | 10.06 |
| $MgF_2$ | 0.13 |
| CsF | 0.39 |
| $SrF_2$ | 0.32 |
| $CeO_2$ | 0.18 |
| SUM | 100.00 |

The fluorine removal efficiency could reach 91% through above defluorination process. Thus obtained defluorinated waste was then immobilized into a vitrified form: a total weight of 20 g defluorinated waste and glass additives was weighed and fully mixed according to the glass formula designed in Table 5 (the waste loading was 25 wt %); the resulting mixture was placed in a 50 mL corundum crucible; the sample was maintained in a muffle furnace at 1200° C. for 1 hour; glass melt was poured on a preheated copper plate mold and cooled to obtain a vitrified form.

TABLE 5

The percentage of defluorinated waste and glass additives in the designed glass formula of embodiment 2 (wt %)

| Component | Defluorinated waste | Glass additive |
|---|---|---|
| $SiO_2$ | | 47.83 |
| $B_2O_3$ | | 15.86 |
| $Al_2O_3$ | | 5.38 |
| CaO | | 5.93 |
| $K_2O$ | 16.29 | |
| $Li_2O$ | 2.13 | |
| $Na_2O$ | 5.26 | |
| $Cs_2O$ | 0.11 | |
| $CeO_2$ | 0.09 | |
| SrO | 0.10 | |
| F | 0.98 | |
| SUM | 25.00 | 75.00 |

Figure 6:
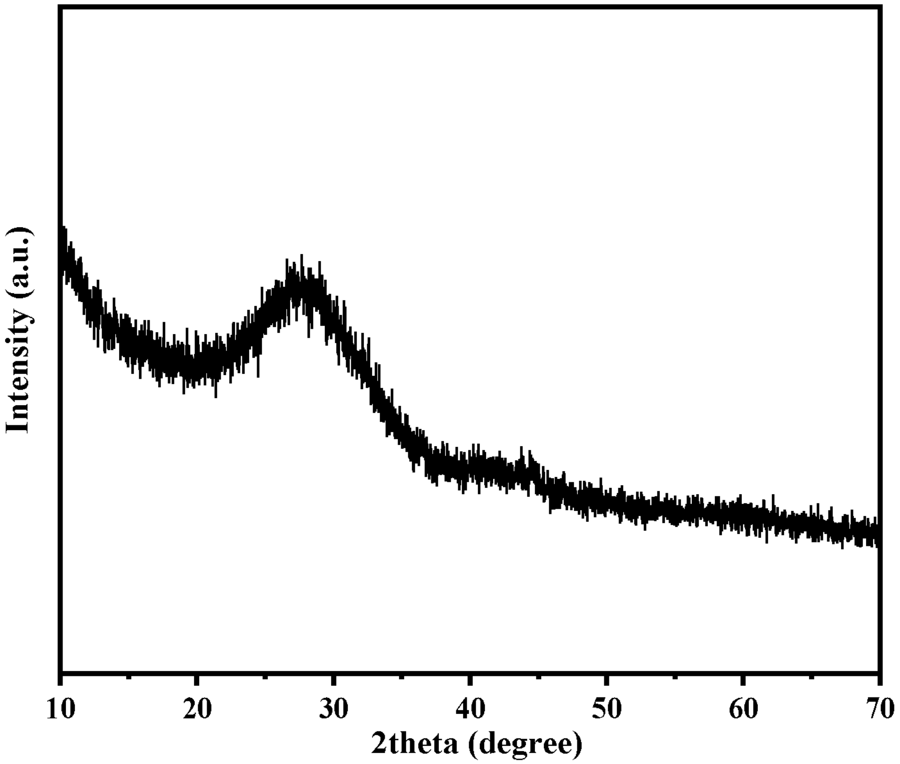
FIG. 6 is an XRD pattern of the vitrified form prepared in embodiment 2 of the present disclosure.

The XRD diffraction pattern (FIG. 6) of the vitrified form prepared in embodiment 2 presents a typical amorphous hump, which proves that the prepared waste form is a glass. An Archimedes principle was used to measure a density, which was 2.48 $g/cm^3$. The chemical durability of vitrified form was evaluated according to the 7-day Product Consistency Test (PCT-7) and the normalized releases of major elements from PCT-7 of the vitrified form in embodiment 2 are shown in Table 6. The values of each element normalized release were lower than 2 $g/m^2$, which meets the requirements of chemical durability of HLW vitrified form.

TABLE 6

Normalized releases of major elements from PCT-7 of the vitrified form in embodiment 2

| Elements | Normalized releases of elements ($r_i$) ($g/m^2$) |
|---|---|
| B | 0.6031 |
| Na | 0.5806 |
| K | 0.6256 |
| Li | 0.4243 |
| Ca | 0.2392 |
| Al | 0.5649 |
| Si | 0.1370 |
| Mg | 0.2782 |
| Sr | 0.3189 |
| Cs | 1.4215 |
| Ce | 0.0527 |

Preferred embodiments of the present disclosure are described above, which don't limit the protection scope of the present disclosure. Any variation or substitution that may be easily made by those skilled in the art within the technical scope disclosed of the present disclosure should be covered by the protection scope of this disclosure.

What is claimed is:

1. A dehalogenation method of radioactive metal halide wastes, consisting of the following steps:

mixing the radioactive metal halide wastes with a dehalogenating agent consisting of an oxalic acid; and performing a thermal treatment to remove halogens from the radioactive metal halide wastes.

2. The dehalogenation method of radioactive metal halide wastes according to claim 1, wherein a temperature of the thermal treatment spans from 100° C. to 600° C.

3. The dehalogenation method of radioactive metal halide wastes according to claim 1, wherein a temperature of the thermal treatment spans from 280° C. to 400° C. and a duration of the thermal treatment spans from 20 min to 1000 min.

4. The dehalogenation method of radioactive metal halide wastes according to claim 1, wherein both the radioactive metal halide wastes and the oxalic acid are solid powders.

5. The dehalogenation method of radioactive metal halide wastes according to claim 1, wherein a molar ratio of the oxalic acid to the halogens is more than 0.5 to mix the oxalic acid with the radioactive metal halide wastes.

6. The dehalogenation method of radioactive metal halide wastes according to claim 1, wherein a molar ratio of the oxalic acid to the halogens spans from 1.2 to 3 to mix the oxalic acid with the radioactive metal halide wastes.

7. The dehalogenation method of radioactive metal halide wastes according to claim 1, wherein the radioactive metal halide wastes are chloride molten salt wastes or/and fluoride molten salt wastes generated from a dry reprocessing of spent nuclear fuel.

8. A vitrification method, comprising a following step: immobilizing the dehalogenated wastes treated by the dehalogenation method of the radioactive metal halide wastes according to claim 1 into a vitrified form by adding glass additives.

9. The vitrification method according to claim 8, wherein the glass additives for forming a vitrified form are borosilicate glass forming chemicals; in terms of the weight percentage of oxides, a waste loading of the vitrified form for the dehalogenated wastes spans from 15% to 35%.

10. A vitrified form, wherein the vitrified form is prepared by the vitrification method according to claim 8.

11. A vitrification method, comprising a following step: immobilizing the dehalogenated wastes treated by the dehalogenation method of the radioactive metal halide wastes according to claim 2 into a vitrified form by adding glass additives.

12. A vitrification method, comprising a following step: immobilizing the dehalogenated wastes treated by the dehalogenation method of the radioactive metal halide wastes according to claim 3 into a vitrified form by adding glass additives.

13. A vitrification method, comprising a following step: immobilizing the dehalogenated wastes treated by the dehalogenation method of the radioactive metal halide wastes according to claim 4 into a vitrified form by adding glass additives.

14. A vitrification method, comprising a following step: immobilizing the dehalogenated wastes treated by the dehalogenation method of the radioactive metal halide wastes according to claim 5 into a vitrified form by adding glass additives.

15. A vitrification method, comprising a following step: immobilizing the dehalogenated wastes treated by the dehalogenation method of the radioactive metal halide wastes according to claim 6 into a vitrified form by adding glass additives.

16. A vitrification method, comprising a following step: immobilizing the dehalogenated wastes treated by the dehalogenation method of the radioactive metal halide wastes according to claim 7 into a vitrified form by adding glass additives.

* * * * *